UNITED STATES PATENT OFFICE.

ARTHUR WILLIAM HEYMAN, OF NORTHAMPTON BOROUGH, PENNSYLVANIA.

PROCESS FOR THE SIMULTANEOUS PRODUCTION OF SOLUBLE ALKALI HYDROXIDS AND CEMENT-MAKING MATERIAL.

1,160,171.

Specification of Letters Patent. Patented Nov. 16, 1915.

No Drawing. Application filed April 17, 1909. Serial No. 490,572.

*To all whom it may concern:*

Be it known that I, ARTHUR W. HEYMAN, a citizen of the United States, and a resident of the borough of Northampton, in the State of Pennsylvania, have invented certain new and useful Improvements in Processes for the Simultaneous Production of Soluble Alkali Hydroxids and Cement-Making Material, of which the following is a specification.

My invention relates to the production of hydroxids of potassium, sodium or other alkali metals, and its object is the conversion of the insoluble alkali compounds existing in rocks, earths or minerals, such as feldspar, granite, slate, mica, cement rock (an argillaceous limestone used in making cement), shale, clay, or other substances, into soluble hydroxids of such alkali metals. For example, feldspar often contains from five to fifteen per cent. of potassium oxid, a valuable material used in agriculture and other arts, this oxid existing in combination with other elements in such manner as to be insoluble and therefore unsuitable for use. By my process this combination is altered or changed in such manner as to render the potassium oxid soluble in water, in which it exists as the hydroxid, whereupon it may be used in this form, or converted to the carbonate, sulfate, nitrate or other salt.

The insoluble portion, as is disclosed later, is suitable for making hydraulic cement; thus the object of my invention is to produce soluble alkali hydroxids and cement making material by a process in which the one is virtually a by-product of the other. To accomplish this object, I proceed as follows: If the substance to be treated is of a silicious or argillaceous nature, such as feldspar, granite, slate, mica, shale or clay, containing little or no calcareous material, then I grind it to a fine powder and intimately mix therewith finely ground limestone, gypsum, marl or other calcareous material. The amount of calcareous material to be added is variable and depends largely on the chemical composition of the material being treated. Furthermore, some rocks, earths and minerals contain, in themselves, sufficient calcareous material or alkaline earth compounds and do not, therefore, require any further addition. If the material to be treated has in itself sufficient calcareous material or alkaline earth compounds, then the preliminary grinding and mixing may be omitted. The mixture, either natural or artificial, of silicious or argillaceous and calcareous materials, is then heated in a suitable kiln or furnace to a red heat or higher. The temperature preferably employed should be from 900 degrees to 1600 degrees centigrade, although it is to be understood that I do not limit myself to these temperatures. Too low heat is to be avoided because of the lack of sufficient chemical action, too high heat is also to be avoided because of the volatility of the alkalis, especially potassium compounds. The hot material is preferably plunged at once into water, or it may be left to cool and subsequently, either in its unground condition or having been mechanically crushed or ground, may be placed in water. In any case the water is used to extract the oxid of potassium, sodium or other alkali metal forming therewith the hydroxid of the metal which is soluble in water. The material should be allowed to remain in contact with the water for a longer or shorter time, dependent on the physical condition of the calcined material, until substantially all of the alkali hydroxid has been extracted. This may be facilitated by the removal of the partially saturated solution and the replacement thereof by fresh water. The partially saturated solution may be used instead of fresh water for the first extraction of calcined material. A small amount of calcium hydroxid which is dissolved with the alkali may be removed by the addition of a small quantity of carbon dioxid gas or of alkali carbonate or bi-carbonate.

The extraction or lixiviation of the calcined product may be conducted in any suitable manner and the solution may be evaporated, to obtain the alkali hydroxid, or it may be first converted to the carbonate, sulfate, nitrate or other desired salt. The compounds obtained may be further purified and separated from one another by crystallization or other suitable means. The residue, remaining after the extraction, may, if the calcium oxid content be approximately 1.7 to 2.2 times the argillaceous material in the residue, be dried or calcined and ground, making an alkali-free Portland cement. If the ratio should be higher or lower than desirable, sufficient finely divided calcareous or argillaceous material to produce such ratio can be mixed therewith and then calcined and ground. It is, however, preferable to so proportion the materials before calcination that no further addition shall be required to make Portland cement from the lixiviated residue.

The process described above as has been shown is applicable to substances either natural or artificial of silicious or argillaceous nature. In the appended claims I make use of the term "argillaceous," but it will be understood that this term is designed to be used in a generic sense in lieu of a better term and to include any natural or artificial substances of a similar nature which contains insoluble alkali from which cement making material can be made by the process described above.

I claim:

1. The herein described process for the simultaneous production of soluble alkali hydroxids and cement making material from argillaceous rocks, earths, or minerals containing insoluble alkali, which consists in furnacing said rocks, earths or minerals in the presence of calcareous compound, and lixiviating said product, with water.

2. The herein described process for the simultaneous production of soluble alkali hydroxids and cement making material from argillaceous rocks, earths or minerals containing insoluble alkali, which consists in adding to said rocks, earths, or minerals a calcareous material, furnacing the mixture, and lixiviating the product, with water.

3. The herein described process for the simultaneous production of soluble alkali hydroxids and cement making material from argillaceous rocks, earths, or minerals containing insoluble alkali, which consists in adding to said rocks, earths, or minerals a calcareous material, furnacing the mixture to a temperature above red heat, and lixiviating the product, with water.

4. The herein described process for the simultaneous production of soluble alkali hydroxids and cement making material from argillaceous rocks, earths or minerals containing insoluble alkali, which consists in adding to said rocks, earths, or minerals a calcareous material, furnacing the mixture, and lixiviating the product with water, thereby dissolving the alkali hydroxids and leaving an insoluble residue of cement making material, said calcareous material being added in such quantity as to produce a calcium oxid content of 1.7 to 2.2 times the argillaceous material in such insoluble residue.

ARTHUR WILLIAM HEYMAN.

Witnesses:
ADA J. HEYMAN,
SAMUEL R. SMITH.